United States Patent [19]
Knapp

[11] 3,741,350
[45] June 26, 1973

[54] ACTUATING AND RETURNING DEVICES FOR DISC BRAKES

[75] Inventor: Wilhelm Knapp, Bad Hamburg, Germany

[73] Assignee: ITT Industries, Inc., New York, N.Y.

[22] Filed: Nov. 1, 1971

[21] Appl. No.: 194,199

[30] Foreign Application Priority Data

Nov. 31, 1970 Germany.............P 20 57 322.2

[52] U.S. Cl.............................. 188/72.6, 188/106 F
[51] Int. Cl............................................. F16d 65/46
[58] Field of Search.............. 188/72.6, 72.9, 106 F, 188/73 CL

[56] References Cited
UNITED STATES PATENTS

| | | | |
|---|---|---|---|
| 3,584,711 | 6/1971 | Margetts | 188/72.6 X |
| 3,507,367 | 4/1970 | Brown et al. | 188/106 F |
| 3,459,282 | 8/1969 | Hoenick et al. | 188/106 F |
| 3,402,791 | 9/1968 | Hoenick | 188/106 F |
| 3,647,031 | 3/1972 | Burnett | 188/72.6 |

FOREIGN PATENTS OR APPLICATIONS 1,009,843  11/1965  Great Britain................. 188/73 CL Primary Examiner—M. Henson Wood, Jr.
Assistant Examiner—Michael Mar
Attorney—C. Cornell Remsen, Philip M. Bolton and Menotti J. Lombardi, Jr. et al.

[57] ABSTRACT

There is disclosed an actuating and returning device for spot-type disc brakes. The device disclosed can be positioned at any desired position around the disc, it is cheap and simple to manufacture. The semi-circular shaft of the actuating lever is held and guided in a semi-circular guideway of a support cover detachably connected to the housing. The shift is secured against axial shafting by means of a power transmitting roller disposed in a semi-circular recess in the shaft with the recess being disposed eccentrically with respect to the axis of the shaft. The roller is guided in a groove formed in the end of the returning spindle adjacent the shaft and is held in its axial position by a guide bore in the housing and by means of a helical spring engaging the spindle adjacent the guide bore.

1 Claim, 3 Drawing Figures

PATENTED JUN 26 1973 3,741,350

Inventor
WILHELM KNAPP

By Alfred C. Hill
Agent 3,741,350

ACTUATING AND RETURNING DEVICES FOR DISC BRAKES

BACKGROUND OF THE INVENTION

This invention relates to spot-type disc brakes and more particularly to actuating and returning devices for hydraulically or mechanically operable spot-type disc brakes.

From the German Pat. DAS No. 1,266,066 it is already known to provide hydraulically or mechanically operable spot-type disc brakes with a planar frame held by a brake carrier and with the brake disc along a chord. The part of the frame lying on one side of the brake disc is connected with a brake cylinder, the piston of which is operable either by a pressure fluid or by a double-armed actuating lever pivotably supported at the frame, and a pressure bolt guided through the bottom of the cylinder. This arrangement is such that after the application of the brake shoe to the brake disc by the piston the frame connected with the brake cylinder is tilted by the reaction force or is shifted transversely to the brake disc and, thus, the brake shoe actuated by the frame part lying on the other side of the brake disc comes into friction contact with the brake disc. The pressure bolt operates on the actuating lever through means of a ball or a roller lying at its tilting bolt and its short lever arm.

These embodiments of spot-type disc brakes, however, have the disadvantage that without a higher design input the actuating lever can be supported pivotably only in the plane of the frame consisting of plates or sheets. The support of the actuating lever over a bolt which is arranged vertically in the plane of the frame, only allows two possibilities for the arrangement of the actuating cable, said possibilities differing by 180°. This arrangement of the actuating lever confined to two possibilities limits the assembling position of the whole disc brake and/or infringes the safety as regards the functioning of the actuation means. Another disadvantage of the embodiments as shown in the German Pat. DAS No. 1,266,066 is that they all have a pivot. This pivot is open and naturally is subject to high surface pressures and, thus, tends to corrode. By the contamination of the support, due to the corrosion or the wear of the different parts, play between pivot and actuating lever results in heaviness or even a jamming of the actuating lever which can lead to the whole brake falling out.

A further disadvantage of the embodiment which is described in the German Pat. DAS No. 1,266,066 is that the ball or roller operating on the pressure bolt, which operates on the actuating lever, does not represent a guarantee against twisting for the brake piston or the adjusting mechanism, respectively.

SUMMARY OF THE INVENTION

The inventor set himself the task of creating a hydraulically or mechanically operable spot-type disc brake which can be arranged in any position around the brake disc and which operates uncomplicatedly and safely. In addition, its manufacturing is to be cheap and simple due to the multiple function of its different parts.

According to the invention the task is solved as follows: the shaft of the actuating lever is held and guided by means of a power transmitting roller disposed eccentrically to the axis of the shaft and which is contained in a support cover. The support cover is connected with the housing in a way that it can be detached. The power transmitting roller is guided in the front groove of the returning spindle (a groove formed in the end of the spindle adjacent the shaft) and secured against axial shifting by the guide bore in the housing for the returning spindle. To protect the actuating shaft, the roller, and the returning spindle from dirt and humidity, a protecting cover of elastomeric material is drawn over the support cover and secured to the housing.

The shaft of the actuating lever is held free from play in its semi-circular guideway in the support cover by means of the power transmitting roller and the returning spindle is held free from play by a helical spring which supports itself in a cage having its outer edge anchored in a groove in the inner wall of the housing by a straddling effect. The arrangement of the pressure spring has the advantage that all parts are supported and held free from play and that they can be easily installed and disassembled.

Therefore, an object of the present invention is to provide a mechanically or hydraulically operable spot-type disc brake with a returning spindle projecting through the actuating piston, said returning spindle cooperating through a returning thread thereon and a returning nut supporting itself conically within the piston, the other end of said returning spindle being sealed in the housing and actuating the actuating piston through a roller controlled by a shaft of the actuating lever.

The advantages provided by the invention particularly consist of the following. By the arrangement of a support cover on the brake carrier fixed there by means of two screws the shaft of the actuating lever can be arranged in any assembling position about the brake disc; i.e., the connection between the actuating cable and the actuating lever can be placed where it can be effected most safely as regards the functioning and where there is enough space between wheel disc and wheel suspension. Thus the assembling position of the whole spot-type disc brake in relation to the brake disc is independent from the mechanical actuating cable. Instead of the two bores employed for fastening the support cover to the housing further diametrically opposite bores can be arranged easily in the brake carrier. A further advantage is the easy reassembling of the brake when replacing the brake linings. After the removing of the two support cover screws, the returning or the adjusting device can be effected by twisting by means of a screw driver, which engages the groove in the end of the returning spindle adjacent the actuating shaft. With other automatic adjusting devices, an additional worm drive and special tools are provided for the adjusting device. This can be omitted in the inventive device because of the multiple function of the returning spindle groove and the roller. According to the invention the pivot for the actuating lever of known embodiments of spot-type disc brakes is replaced advantageously by the semi-cylindrical support in the support cover. The shaft of the actuating lever and the roller thus lie protected from dust, dirt, and humidity in the cavity formed by the support cover and the brake carrier which is sealed by a elastomeric material. The securing of the shaft of the actuating lever in axial direction is effected by the roller engaging synclinally in the actuation shaft, said roller being held free from play by the brake carrier bore in which the returning spindle is supported, and being guided by the groove arranged in the front side of the returning spindle.

A feature of the present invention is the provision in a hydraulically or mechanically operable spot-type disc brake of an actuating piston having a cup shape and conical inner wall; a returning spindle disposed axially of the piston and having one end thereof projecting into the piston, the spindle having a returning thread on the other surface thereof; a returning nut engaging the returning thread and supported on the inner wall of the piston; a housing disposed coaxially of the piston, the spindle and the nut and providing a coaxial guide bore for the spindle adjacent the other end thereof; a support cover disposed adjacent the other end of the spindle detachably connected to the housing, the cover having a semi-circular guideway disposed therein; a semi-circular actuating shaft held in and guided by the guideway of the cover, the shaft having a synclinal recess disposed eccentrically with respect to the axis of the shaft, the axis of the shaft and the axis of the spindle being in a perpendicular spaced relation, a groove disposed in the other end of the spindle; and a power transmitting roller contained in the recess and the groove to transmit linear motion to the spindle from rotation of the shaft to actuate the piston upon actuation of the shaft.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figure 1:
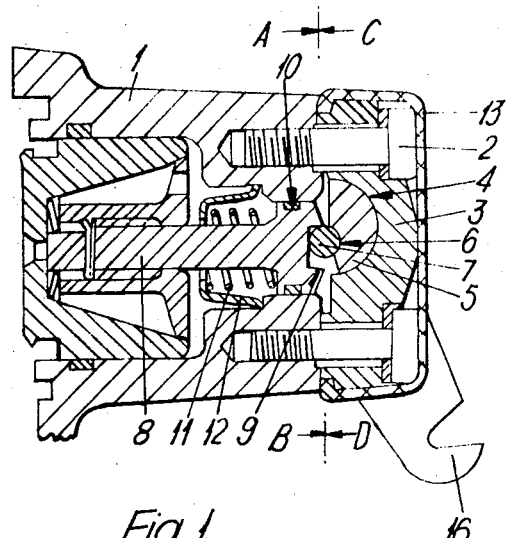
FIG. 1 illustrates longitudinal cross sectional view through a portion of a spot-type disc brake in accordance with the principles of the present invention.

FIG. 1 represents a longitudinal cross section view of one half of a spot-type disc brake incorporating the actuating and returning device of the present invention. Support cover 3 is secured to brake carrier 1 by means of two screws 2. Carrier 1 includes coaxially therein brake actuating piston 17 having a cup shape with conical inner walls and returning nut 19 supported by the inner wall of piston 17. Support cover 3 has cylindrical recess 4 at its front side approximately in the middle of cover 3, said front side facing brake carrier 1. Shaft 5 of actuating lever 16 is supported and guided in cylindrical recess or guideway 4. Shaft 5 of approximately semi-circular cross section in its axial plane has a synclinal cylindrical recess 6 disposed eccentrically with respect to its axis. Roller 7 is fitted in recess 6. Roller 7 serves as a power transmission member between shaft 5 of semi-circular cross-section and returning spindle 8. Roller 7 is guided in the recess 6 of shaft 5 of semi-circular cross section and groove 9 formed in the end of the returning spindle 8 adjacent shaft 5 and is secured against axial shifting by guide bore 10 in housing 1 for returning spindle 8. The freedom from play of the three parts, shaft 5, roller 7 and spindle 8 is guaranteed by a helical pressure spring 11 arranged coaxially of returning spindle 8. One end of spring 11 supports itself on a step of returning spindle 8 having first and second portions of different diameter, said second portion engaging bore 10. The other end of spring 11 is supported in cage 12 which is anchored in a groove 20 on the inner wall of housing 1 by its outer edge by straddling effect. Spindle 8 includes on its outer surface returning thread 18 which cooperates with returning nut 19.

The periphery of support cover 3 has a step 21 on the side facing brake carrier 1, said step being engaged by protecting cover 13 made of elastomeric material. The protecting cover 13 covers the whole support cover and thus protects the actuating device from dirt and humidity. A continuous steady lubrication and indispensable safety as regards the functioning are thus guaranteed.

Figure 2:
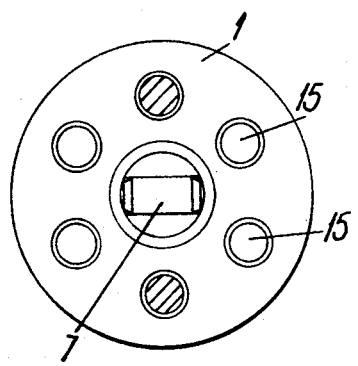
FIG. 2 illustrates a transverse cross sectional view along line 2—2 of FIG. 1 looking in the direction AB.

FIG. 2 illustrates the transverse cross section through the spot-type along line 2—2 of FIG. 1 looking in the direction AB. Roller 7 is prevented from axial shifting by guide bore 10 in housing 1 for returning spindle 8. The brake carrier has several diametrically opposite thread bores 15 for the different possible assembling positions of the spot-type disc brake in relation to the non-represented disc of the disc brake.

Figure 3:
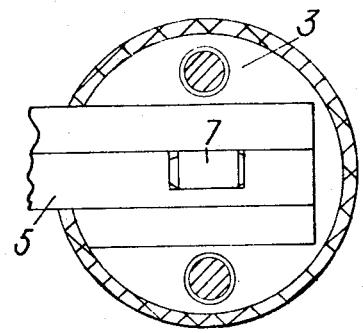
FIG. 3 illustrates a transverse cross sectional view along line 2—2 of FIG. 1 looking in the direction CD.

FIG. 3 illustrates the transverse cross section along line 2—2 of FIG. 1 looking in the direction CD. Roller 7 lies in cylindrical recess 6 disposed eccentrically to the axis of actuating shaft 5 of semi-circular cross section. Roller 7 secures shaft 5 of actuating lever 16 against axial shifting.

The operation of the embodiment illustrated in Figures in the FIGS. 1 to 3 is as follows. Actuating lever 16 twists shaft 5 of semi-circular cross section in its cylindrical guideway 4 of support cover 3. This angular movement is transformed into a rectilinear movement by roller 7 which is arranged eccentrically with respect to the axis of shaft 5. Roller 7 is supported in groove 9 of spindle 8 in such a way that transverse forces occur as little as possible upon power transmission from roller 7 to spindle 8. The actuating force is transmitted from spindle 8 of the returning device to brake actuating piston 17 and, thus, to the brake shoes.

While I have described above the principles of my invention in connection with specific apparatus it is to be more clearly understood that this description is made only by way of example and not as a limitation to the scope of my invention as set forth in the objects thereof and in the accompanying claims.

I claim:

1. In a hydraulically or mechanically operable spot-type disc brake;
   an actuating piston having a cup shape and conical inner wall;
   a returning spindle disposed axially of said piston and having one end thereof projecting into said piston, said spindle having a returning thread on the outer surface thereof;
   a returning nut engaging said returning thread and supported on said inner wall;
   a housing disposed coaxially of said piston, said spindle and said nut and providing a coaxial guide bore for said spindle adjacent the other end thereof, said spindle being disposed completely within said housing;
   a support cover disposed adjacent said other end of said spindle detachably connected to said housing, said cover having a semi-circular guideway disposed therein;

a semi-circular actuating shaft held in and guided by said guideway of said cover, said shaft having a synclinal recess disposed eccentrically with respect to the axis of said shaft, the axis of said shaft and the axis of said spindle being in a perpendicular spaced relation;

a groove disposed in said other end of said spindle;

a power transmitting roller contained in said recess of said groove to transmit linear motion to said spindle from rotation of said shaft to actuate said piston upon actuation of said shaft;

said spindle further including a first portion having a given diameter adjacent said one end thereof and a second portion interconnected with said first portion, said second portion having a second diameter greater than said first diameter adjacent said other end of said spindle engaging said guide bore;

a helical spring disposed coaxially of said first portion of said spindle, one end of said spring bearing against a step provided by the interconnection of said first and second portions of said spindle to hold said shaft in said guideway of said cover free from play, said spring being disposed completely within said housing;

a cage anchored to a groove in the inner wall of said housing to support the other end of said spring; and a protecting cover of elastomeric material clamped between the adjacent ends of said housing and said support cover and disposed to completely cover the exterior of said support cover to protect components enclosed by said housing and said support cover from dirt and humidity and to enable lubrication of said components.

* * * * *